United States Patent [19]
Maeda et al.

[11] Patent Number: 5,884,074
[45] Date of Patent: Mar. 16, 1999

[54] MICROCOMPUTER UTILIZING FLASH MEMORY FOR DATA STORAGE

[75] Inventors: Shohei Maeda; Nobusuke Abe, both of Tokyo, Japan

[73] Assignee: Mitsubishi Denki Kabushiki Kaisha, Tokyo, Japan

[21] Appl. No.: 804,670

[22] Filed: Feb. 25, 1997

[30] Foreign Application Priority Data

Oct. 11, 1996 [JP] Japan ................................. 8-270332

[51] Int. Cl.⁶ ....................................................... G06F 9/44
[52] U.S. Cl. ................................................................ 395/652
[58] Field of Search ..................................... 395/651, 652

[56] References Cited

U.S. PATENT DOCUMENTS

| | | | |
|---|---|---|---|
| 5,568,641 | 10/1996 | Nelson et al. | 395/652 X |
| 5,664,194 | 9/1997 | Paulsen | 395/652 X |
| 5,768,584 | 6/1998 | MacDonald et al. | 395/651 |
| 5,805,882 | 9/1998 | Cooper et al. | 395/652 |

FOREIGN PATENT DOCUMENTS

| | | |
|---|---|---|
| A 63-101949 | 5/1988 | Japan . |
| A 6-44064 | 2/1994 | Japan . |
| A 7-49852 | 2/1995 | Japan . |
| A 8-101794 | 4/1996 | Japan . |

*Primary Examiner*—Thomas M. Heckler
*Attorney, Agent, or Firm*—Burns, Doane, Swecker & Mathis, LLP

[57] ABSTRACT

A microcomputer having a program storing unit (16) separately from a CPU. The program storing unit (16) receives from a host computer (7) a boot program used for loading data into a flash memory (11), and stores the boot program into a RAM (2), when a mode decision circuit (15) makes a decision that a chip mode is an RSIF mode. This solves a problem of a conventional microcomputer in that it must reserve a boot program area in the flash memory in advance to prestore the boot program in the boot program area, and hence the entire area of the flash memory cannot be released as a user program area.

8 Claims, 5 Drawing Sheets

FIG. 3

| MOD0 | MOD1 | VPP | CHIP MODE | RESET VECTOR |
|---|---|---|---|---|
| 0 | 0 | VL | SINGLE CHIP MODE | BEGINNING ADDRESS OF FLASH MEMORY |
| 0 | 0 | VH | FLASH MODE | BEGINNING ADDRESS OF RAM |
| 0 | 1 | VL | MEMORY EXTENSION MODE | BEGINNING ADDRESS OF FLASH MEMORY |
| 0 | 1 | VH | FLASH MODE | BEGINNING ADDRESS OF RAM |
| 0 | VH | VL | RSIF MODE | BEGINNING ADDRESS OF FLASH MEMORY |
| 0 | VH | VH | RSIF MODE | BEGINNING ADDRESS OF RAM |

"0" ··· 0V IS APPLIED
"1" ··· 5V IS APPLIED
"VL" ··· 0V IS APPLIED
"VH" ··· 12V IS APPLIED

MICROCOMPUTER UTILIZING FLASH MEMORY FOR DATA STORAGE

BACKGROUND OF THE INVENTION

1. Field of the Invention

The present invention relates to a microcomputer capable of effectively storing data like user programs (briefly referred to as "user programs" below) in a flash memory incorporated in the microcomputer.

2. Description of Related Art

FIG. 6 is a block diagram showing a configuration of a conventional microcomputer. In this figure, the reference numeral 1 designates a microcomputer including a RAM 2 and a flash memory 3. The flash memory 3 includes a boot program area 3a and a user program area 3b as shown in FIG. 7. The boot program area 3a is provided for storing a boot program used for loading user programs, and the user program area 3b is provided for storing the user programs.

The reference numeral 4 designates a CPU, 5 designates a serial interface (abbreviated to SIO from now on) of the microcomputer 1, 6 designates an internal bus of the microcomputer 1, and 7 designates an external host computer. The CPU 4 executes the boot program stored in the boot program area 3a of the flash memory 3 to load the user programs into the user program area 3b of the flash memory 3. The user programs are received from the host computer 7 through the SIO 5, and stored in the user program area 3b of the flash memory 3.

Next, the operation will be described.

A user can freely store the user programs in the user program area 3b of the flash memory 3 in the microcomputer 1.

A procedure for storing the user programs in the user program area 3b of the flash memory 3 will now be described.

First, the CPU 4 sets its program counter at the beginning address of the boot program area 3a to start the boot program which has been stored in the boot program area 3a of the flash memory 3.

Starting the boot program, the CPU 4 receives the user programs from the host computer 7 through the SIO 5 in accordance with the boot program, and stores the user programs into the user program area 3b of the flash memory 3.

Thus, the conventional microcomputer can load the user programs into the user program area 3b of the flash memory 3 by executing the boot program stored in the boot program area 3a of the flash memory 3. However, since the boot program must be prestored in the boot program area 3a of the flash memory 3, the user programs cannot use the entire area of the flash memory 3.

Japanese patent application laid-open No. 7-49852 (1995) discloses a technique in which the CPU 4 receives the boot program from the host computer 7. This technique, however, has a problem in that it must prestore a load program for receiving the boot program in the flash memory 3, and so it cannot release the entire area of the flash memory 3 as the user program area 3b.

SUMMARY OF THE INVENTION

The present invention is made for solving the foregoing problem, and its object is to provide a microcomputer capable of releasing the entire area of the flash memory for a user program area.

According to one aspect of the present invention, there is provided a microcomputer comprising program storing means provided separately from a CPU, wherein the program storing means receives from a host computer a boot program used for loading data into a flash memory, and stores the boot program into a RAM, when mode decision means makes a decision that a chip mode is an RSIF mode.

This offers an advantage that it is unnecessary to reserve a boot program area in the flash memory in advance for storing the boot program, and hence the entire area of the flash memory can be released as a user program area.

Here, the program storing means may comprise a shift register for receiving the boot program transmitted from the host computer when the mode decision means makes a decision that the chip mode is the RSIF mode; data transfer means for transferring one frame data constituting the boot program to the RAM when the shift register receives the one frame data; and address decision means for incrementing a write address of the data transfer means each time the shift register receives the one frame data constituting the boot program.

This offers an advantage that the program storing means can be implemented by a very compact hardware configuration.

The microcomputer may provide the host computer with error information when a write command is not received correctly which is sent from the host computer before transmission of the boot program.

This offers an advantage that the user can confirm that the user programs are not stored in the flash memory owing to communication error or the like.

The microcomputer may further comprise a multiplexer for connecting one of the program storing means and a serial interface to the host computer through an external terminal of the microcomputer in response to the chip mode decided by the mode decision means.

This offers an advantage that the number of the external terminal of the microcomputer can be reduced.

BRIEF DESCRIPTION OF THE DRAWINGS

FIG. 3 is a diagram illustrating a chip mode and a reset vector of the microcomputer;

DETAILED DESCRIPTION OF THE PREFERRED EMBODIMENTS

The invention will now be described with reference to the accompanying drawings.

EMBODIMENT 1

Figure 1:
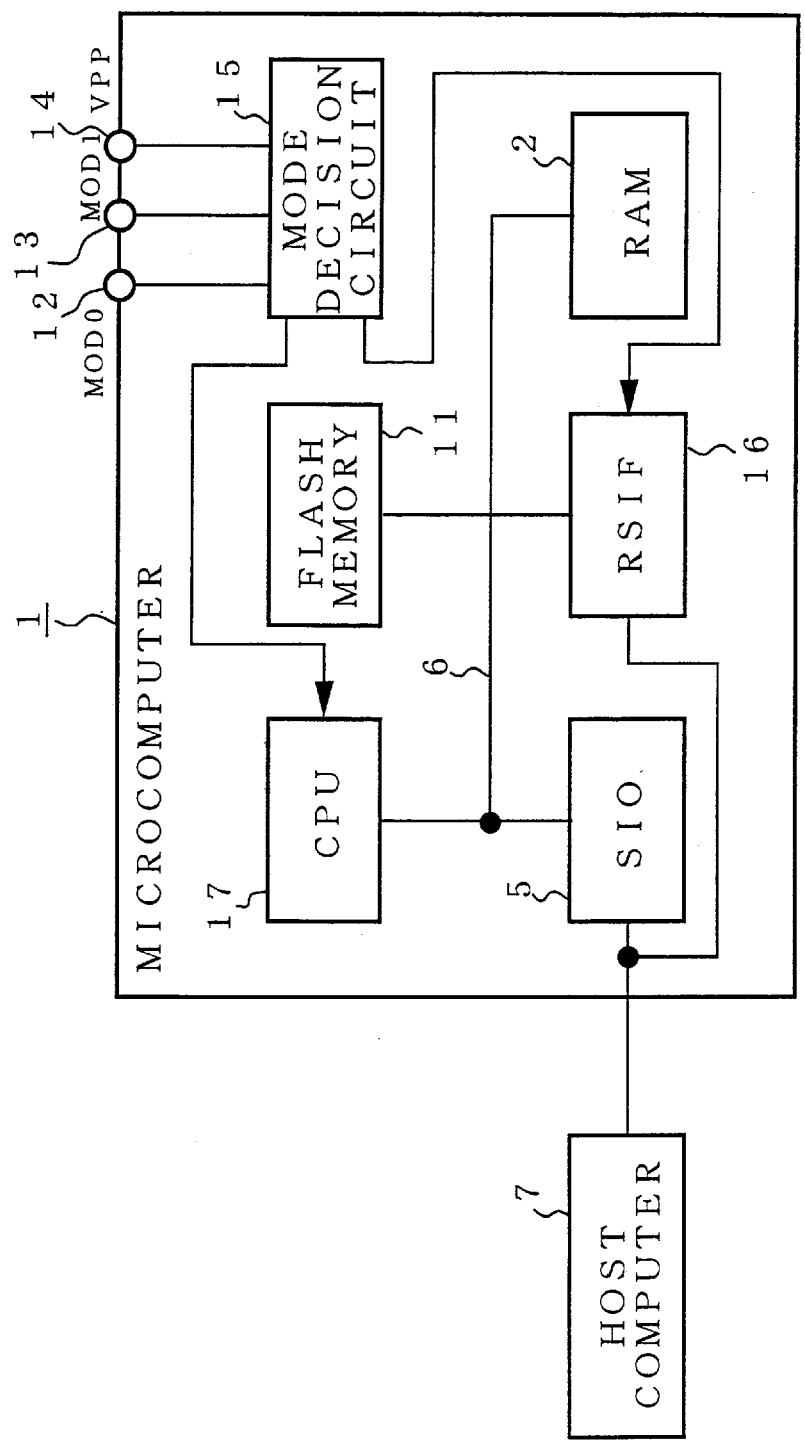
FIG. 1 is a block diagram showing an embodiment 1 of a microcomputer in accordance with the present invention.

FIG. 1 is a block diagram showing an embodiment 1 of the microcomputer in accordance with the present invention. In this figure, the reference numeral 1 designates a microcomputer, 2 designates a RAM of the microcomputer 1, 5 designates an SIO (serial interface) of the microcomputer 1, 6 designates an internal bus of the microcomputer 1, and 7 designates an external host computer.

The reference numeral 11 designates a flash memory serving as a nonvolatile memory for storing the user programs, 12 designates a mode terminal (referred to as MOD0 below) of the microcomputer 1, to which a voltage of 0 V or 5 V is applied. The reference numeral 13 designates another mode terminal (referred to as MOD1 blow) of the microcomputer 1, to which a voltage of 0 V or 5 V is applied. The reference numeral 14 designates still another mode terminal (referred to as VPP below) of the microcomputer 1, to which a voltage of 0 V or 12 V is applied.

The reference numeral 15 designates a mode decision circuit (mode decision means) for determining a chip mode in accordance with a combination of voltages applied to the mode terminals 12–14, MOD0, MOD1 and VPP; 16 designates an RSIF (program storing means) which receives from the host computer 7 a boot program used for loading the user programs into the flash memory 11, and which stores the boot program in the RAM 2, when the mode decision circuit 15 decides that the chip mode is an RSIF mode; and 17 designates a CPU for receiving the user programs from the host computer 7 through the SIO 5, and for storing the user programs in the flash memory 11 by executing the boot program stored in the RAM 2, when the mode decision circuit 15 decides that the chip mode is a flash mode.

Figure 2:
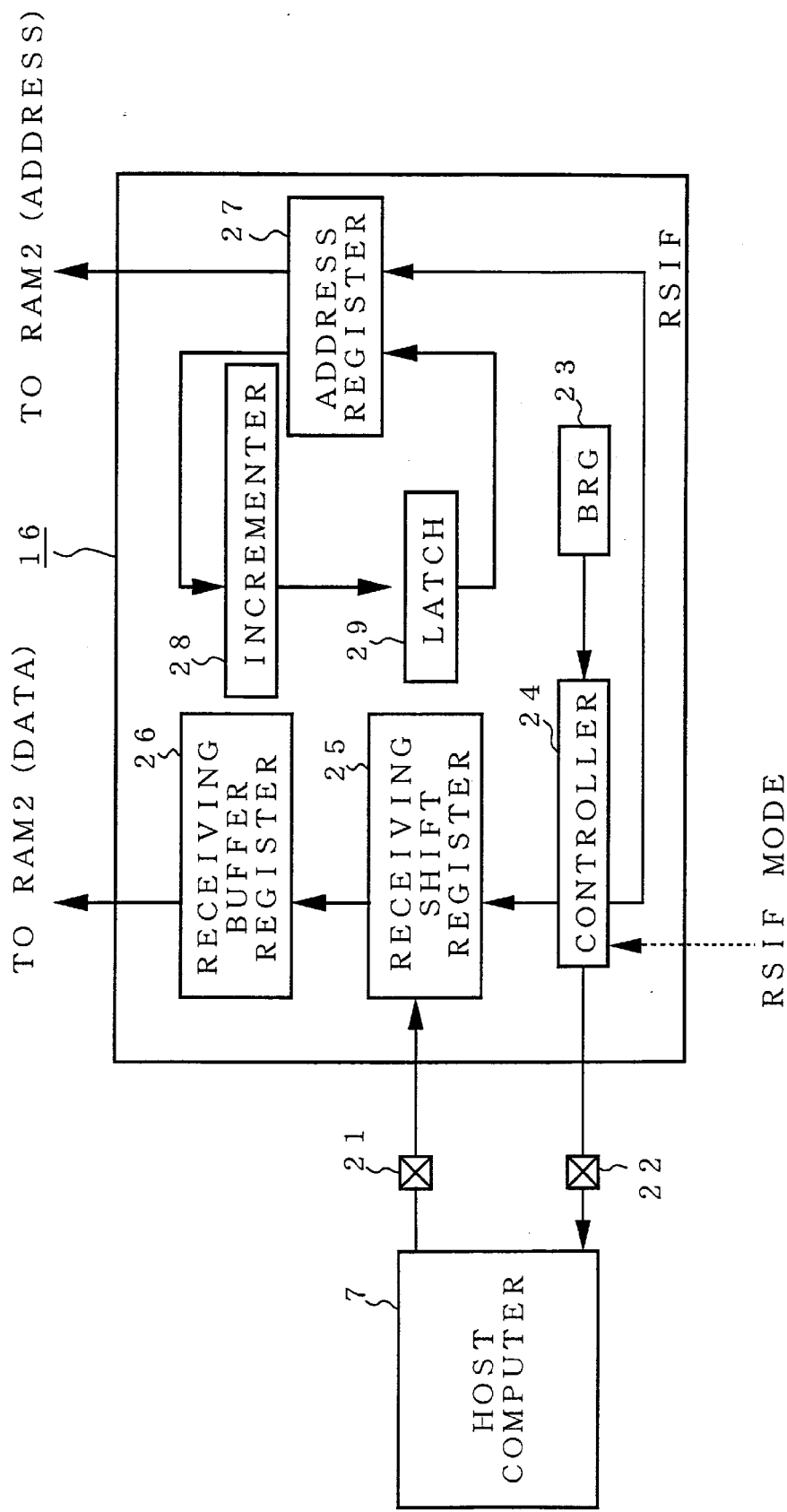
FIG. 2 is a block diagram showing the details of RSIF 16 of FIG. 1.

FIG. 2 is a block diagram showing details of the RSIF 16. In this figure, the reference numerals 21 and 22 designate external terminals for connecting the RSIF 16 to the host computer 7, 23 designates a clock generator for generating a clock signal, 24 designates a controller for controlling a receiving shift register 25 and an address register 27, when the mode decision circuit 15 decides that the chip mode is the RSIF mode. The receiving shift register 25 receives the boot program sent from the host computer 7 when the mode decision circuit 15 decides that the chip mode is the RSIF mode. The reference numeral 26 designates a receiving buffer register (data transfer means) for transferring to the RAM 2 one frame data constituting the boot program each time it is received by the receiving shift register 25.

The address register 27 (address decision means) is provided for outputting a write address of the data in the receiving buffer register 26. The reference numeral 28 designates an incrementer (address decision means) for incrementing the write address of the data in the receiving buffer register 26 each time the receiving shift register 25 receives the one frame data constituting the boot program; and 29 designates a latch (address decision means) for rewriting the address value in the CPU 17 in response to the output of the incrementer 28.

Next, the operation of the embodiment 1 will be described.

A user can freely store the user programs in the flash memory 11 of the microcomputer 1.

The procedure for storing the user programs in the flash memory 11 will be described.

The microcomputer 1 decides the chip mode in accordance with the combinations of the voltages applied to the mode terminals 12–14, MOD0, MOD1 and VPP. Accordingly, to load the user programs in the flash memory 11, the user must set the chip mode to the RSIF mode first by applying voltages 0 V to the MOD0, and 12 V to the MOD1 and VPP, respectively, as shown in FIG. 3.

Here, the microcomputer 1 has four chip modes whose functions are as follows:

RSIF Mode: A mode in which the boot program is transferred from the host computer 7 to the RAM 2.

Flash Mode: A mode in which the CPU 17 writes the user programs in the flash memory 11.

Single Chip Mode: A user released mode in which the CPU 17 can access the flash memory 11, but cannot access an externally connected memory.

Memory Extension Mode: A user released mode in which the CPU 17 can access both the flash memory 11 and the externally connected memory.

When the user applies 0 V to the MOD0, and 12 V to the MOD1 and VPP, the mode decision circuit 15 makes decision that the chip mode is set to the RSIF mode, and provides the RSIF 16 and CPU 17 with that information.

By this, the CPU 17 enters a waiting state, and the RSIF 16 starts a processing for transferring the boot program from the host computer 7 to the RAM 2.

Figure 4:
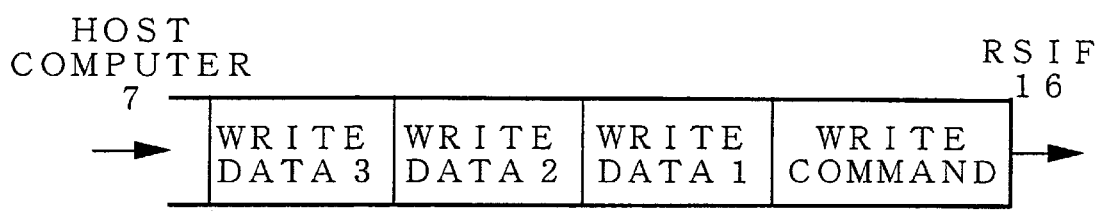
FIG. 4 is a diagram illustrating the transmission format of data.

When the host computer 7 sends to the microcomputer 1 the boot program with a write command added at its beginning as shown in FIG. 4, the receiving shift register 25 of the RSIF 16 receives the boot program.

More specifically, the controller 24 makes a decision whether the write command added at the beginning of the boot program is correctly received or not, and has the receiving shift register 25 continue the receiving processing of the boot program when it is correctly received. On the other hand, if it is not received correctly, the controller 24 sends error information to the host computer 7, and carries out a processing to inform the user of that.

The receiving shift register 25, thus continuing the receiving processing of the boot program when the write command is correctly received, transfers to the receiving buffer register 26 one frame data constituting the boot program each time it receives the one frame data.

Then, the receiving buffer register 26 transfers the one frame data to the RAM 2 through the internal bus 6 each time it receives the one frame data.

In this case, the first one frame data constituting the boot program is written from the beginning address of the RAM 2, because a reset vector must be set at the first address of the RAM 2 as shown in FIG. 3, when the chip mode is in the RSIF mode. The successive frame data are written to the RAM 2 in response to the write addresses sequentially output from the address register 27.

The boot program is continuously written in the RAM 2 because the incrementer 28 and latch 29 increment the write address of the data in the receiving buffer register 26 by incrementing the address value of the address register 27 each time the receiving shift register 25 receives the one frame data constituting the boot program.

After the boot program has been stored in the RAM 2, the user must change the chip mode to the flash mode by applying 0 V to the MOD0, 5 V to the MOD1, and 12 V to the VPP as shown in FIG. 3, so that the CPU 17 starts the boot program for loading the user programs in the flash memory 11.

When these voltages are applied thereto, the mode decision circuit 15 makes a decision that the chip mode has been set at the flash mode, and provides that information to the RSIF 16 and CPU 17.

Then, the RSIF 16 enters a waiting state, and the CPU 17 starts the boot program stored in the RAM 2 to receive the user programs from the host computer 7 through the SIO 5, thus to carries out the writing process of the user programs to the flash memory 11.

Incidentally, the CPU 17 starts the boot program because the reset vector has been set at the beginning address of the RAM 2 as shown in FIG. 3 when the user changes the chip mode to the flash mode.

As described above, according to the embodiment 1, since the RSIF 16 is separately provided from the CPU 17 to receive the boot program from the host computer 7 and store them in the RAM 2 when the mode decision circuit 15 makes a decision that the chip mode is the RSIF mode, it becomes unnecessary to reserve the boot program area in the flash memory 11 in advance to prestore the boot program therein. This offers an advantage that the entire area of the flash memory 11 can be released as the user program area.

EMBODIMENT 2

Figure 5:
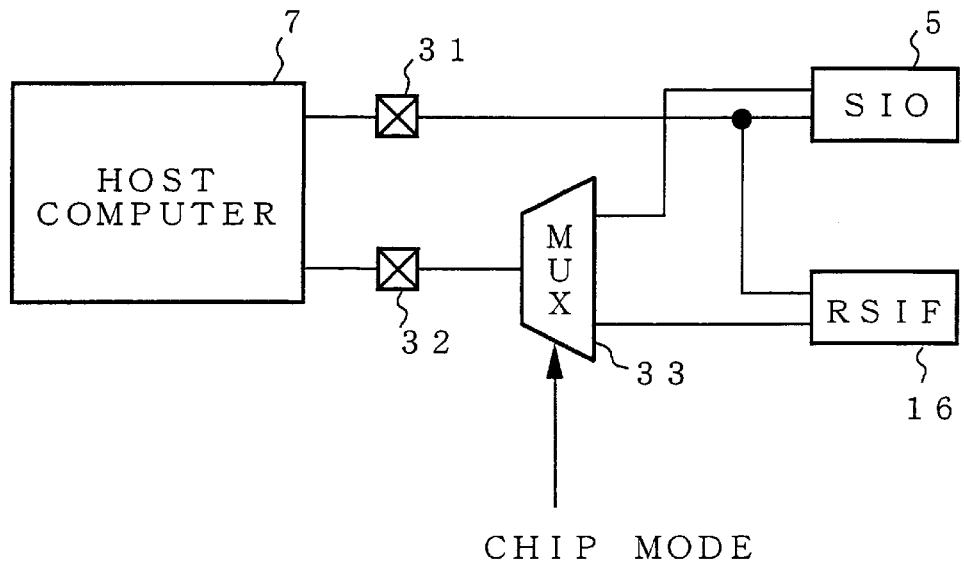
FIG. 5 is a block diagram showing a main portion of an embodiment 2 of the microcomputer in accordance with the present invention.
Figure 6:
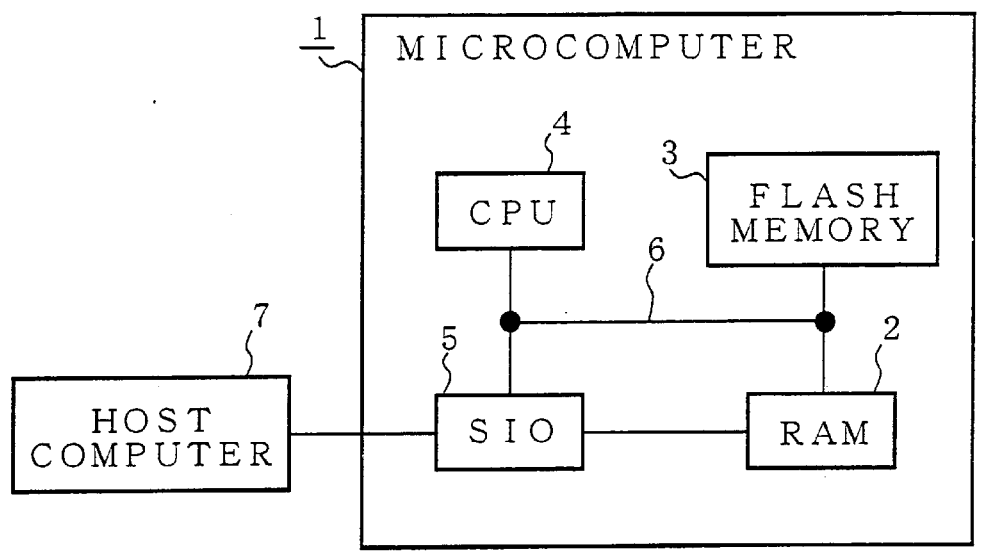
FIG. 6 is a block diagram showing a conventional microcomputer.
Figure 7:
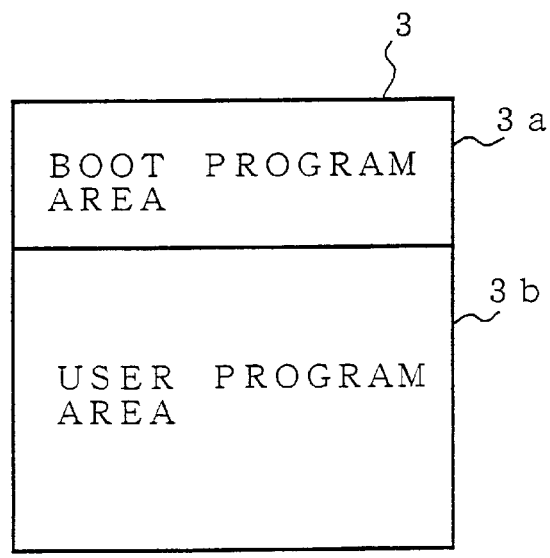
FIG. 7 is a schematic diagram illustrating internal areas of a flash memory 3.

FIG. 5 is a block diagram showing a major portion of an embodiment 2 of the microcomputer in accordance with the present invention. In this figure, like portions to those of FIG. 1 are designated by the same reference numerals, and the description thereof is omitted here.

The reference numeral 31 designates an input terminal (external terminal) of the microcomputer 1 for connecting the RSIF 16 or the SIO 5 to the host computer 7; 32 designates an output terminal (external terminal) of the microcomputer 1 for connecting the RSIF 16 or the SIO 5 to the host computer 7; and 33 designates an MUX (multiplexer) for connecting one of the RSIF 16 or the SIO 5 to the host computer 7 through the output terminal 32 in response to the chip mode determined by the mode decision circuit 15.

Next, the operation of the embodiment 2 will be described.

Although a connecting method of the RSIF 16 and SIO 5 to the host computer 7 is not particularly mentioned in the foregoing embodiment 1, the RSIF 16 and SIO 5 can share an external terminal of the microcomputer 1 by providing the MUX 33 with a function to change the connection with the host computer 7 in response to the chip mode as shown in FIG. 5.

More specifically, when the mode decision circuit 15 makes a decision that the chip mode is set at the RSIF mode, the MUX 33 connects the RSIF 16 to the host computer 7. In contrast, when the mode decision circuit 15 makes a decision that the chip mode is set at the flash mode, the MUX 33 connects the SIO 5 to the host computer 7.

What is claimed is:

1. A microcomputer comprising:

a RAM (random-access memory);

a flash memory;

a serial interface;

a plurality of mode terminals;

mode decision means for deciding a chip mode in response to a combination of voltages applied to said plurality of mode terminals;

program storing means for receiving a boot program from a host computer, and for storing said boot program into said RAM, when said mode decision means makes a decision that the chip mode is an RSIF mode, said boot program being used for loading data into said flash memory; and a CPU for executing said boot program stored in said RAM to receive data from said host computer through said serial interface, and to store the data in said flash memory.

2. The microcomputer as claimed in claim 1, wherein said program storing means comprises:

a shift register for receiving said boot program transmitted from said host computer when the mode decision means makes a decision that the chip mode is the RSIF mode;

data transfer means for transferring one frame data constituting said boot program to said RAM when said shift register receives the one frame data; and address decision means for incrementing a write address of said data transfer means each time said shift register receives said one frame data constituting said boot program.

3. The microcomputer as claimed in claim 1, wherein said program storing means comprises a controller for providing said host computer with error information when a write command is not received correctly which is sent from said host computer before transmission of said boot program.

4. The microcomputer as claimed in claim 2, wherein said program storing means comprises a controller for providing said host computer with error information when a write command is not received correctly which is sent from said host computer before transmission of said boot program.

5. The microcomputer as claimed in claim 1, further comprising an external terminal; and a multiplexer for connecting one of said program storing means and said serial interface to said host computer through said external terminal in response to the chip mode decided by said mode decision means.

6. The microcomputer as claimed in claim 2, further comprising an external terminal; and a multiplexer for connecting one of said program storing means and said serial interface to said host computer through said external terminal in response to the chip mode decided by said mode decision means.

7. The microcomputer as claimed in claim 3, further comprising an external terminal; and a multiplexer for connecting one of said program storing means and said serial interface to said host computer through said external terminal in response to the chip mode decided by said mode decision means.

8. The microcomputer as claimed in claim 4, further comprising an external terminal; and a multiplexer for connecting one of said program storing means and said serial interface to said host computer through said external terminal in response to the chip mode decided by said mode decision means.

* * * * *